US007810842B2

(12) United States Patent
Ichikawa

(10) Patent No.: US 7,810,842 B2
(45) Date of Patent: Oct. 12, 2010

(54) VEHICULAR CANISTER ATTACHMENT STRUCTURE

(75) Inventor: Daijiro Ichikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 270 days.

(21) Appl. No.: 12/079,345

(22) Filed: Mar. 26, 2008

(65) Prior Publication Data

US 2008/0237283 A1 Oct. 2, 2008

(30) Foreign Application Priority Data

Mar. 30, 2007 (JP) ............................ 2007-091409

(51) Int. Cl.
*B62D 21/16* (2006.01)
*B62D 21/17* (2006.01)

(52) U.S. Cl. ........................ 280/782; 280/783; 280/834

(58) Field of Classification Search ................. 180/311, 180/312; 280/781, 782, 783, 795, 834; 224/400, 224/401; 123/518, 519; 296/37.1, 37.14
See application file for complete search history.

(56) References Cited

U.S. PATENT DOCUMENTS 4,727,955 A * 3/1988 Honda et al. ................ 180/296
4,784,643 A * 11/1988 Siretchi et al. .............. 604/122
5,060,620 A * 10/1991 Oslapas ....................... 123/519
5,224,455 A * 7/1993 Ogasawara ................. 123/519
5,858,198 A * 1/1999 Florio et al. ................ 205/183
5,868,428 A * 2/1999 Ishikawa .................... 280/834
6,105,708 A * 8/2000 Amano et al. ............... 180/309
6,308,987 B1 * 10/2001 Mitake ....................... 280/834
7,134,426 B2 * 11/2006 Uchino et al. ............... 123/518
7,438,058 B2 * 10/2008 Ito et al. ..................... 123/518
2004/0200356 A1 * 10/2004 Kuperus ...................... 96/147

FOREIGN PATENT DOCUMENTS

JP 60-151128 8/1985
JP 60-203528 10/1985
JP 60-236834 11/1985
JP 60-236835 11/1985
JP 09-049460 2/1997

* cited by examiner

*Primary Examiner*—Eric Culbreth
*Assistant Examiner*—Joseph Rocca
(74) *Attorney, Agent, or Firm*—Carrier, Blackman & Associates P.C.; William D. Blackman; Joseph P. Carrier

(57) ABSTRACT

A vehicular canister attachment structure which dispenses with a drain tube, is readily installed, and is low in cost. A canister attached to a bottom or side surface of a floor frame and a cross-member forming part of a vehicle body has an air communication part, which is inserted into the floor frame.

10 Claims, 6 Drawing Sheets

VEHICULAR CANISTER ATTACHMENT STRUCTURE

FIELD OF THE INVENTION

The present invention relates to a vehicular canister attachment structure wherein a canister or a canister filter added to the canister is attached to a vehicle body.

BACKGROUND OF THE INVENTION

Generally, in vehicular canister attachment structures of the above type, a drain tube extends from the canister; a joint is attached to the drain tube; the joint is attached to a body forming member comprising a floor frame, a cross-member, or the like; and an air vent hole of the canister faces the body forming member. The air vent holes of the canister protect against dust and rainwater.

A canister attachment structure in which the canister air vent holes are located around a rear fender is known, as disclosed in Japanese Patent Application Laying-Open Publication No. 9-49460 (JP 09-49460 A). The canister attachment structure disclosed in JP 09-49460 A is shown in FIG. 5 hereof.

A vehicular canister attachment structure 200 shown in FIG. 5 comprises a canister 201, an air intake and discharge path 203 that is connected to an air communication port 202 of the canister 201 and admits and discharges air, an air-intake path 204 that branches from the air intake and discharge path 203 and admits air, a canister filter (dust filter) 205 provided to a distal end of the air-intake path 204 and cleans the air, and an air-discharge path 206 that branches from the drain path 203 and discharges air.

The distal end of the air-intake path 204 is oriented upward of the vehicle body, is located at an upper portion of a rear wheel housing 208, and is open to admit air. A distal end of the air-discharge path 206 is oriented rearward of the vehicle body and is located at a lower portion of the rear wheel housing 208.

However, in the aforedescribed canister attachment structure 200, the air intake and discharge path 203 extends from the air communication port 202 of the canister 201, and the air-intake path 204 and the air-discharge path 206 branch from the path 203. Therefore, the attachment structure of the air intake and discharge path 203, the air-intake path 204, and the air-discharge path 206 becomes complex, thereby increasing the number of man-hours required for installation and increasing the cost.

In the canister attachment structure 200, it is necessary to consider measures against vapor leakage resulting from the provision of the air intake and discharge path 203, the air-intake path 204, and the air-discharge path 206.

FIGS. 6 and 7 show a vehicular canister attachment structure having a structure that is different from the canister attachment structure of Japanese Laid-open Patent Application No. 9-49460.

In FIGS. 6 and 7, a canister attachment structure 210 comprises a body forming member having a floor frame 211 and a cross-member 212 mounted on the floor frame 211. A canister 213 is attached to the cross-member 212. A canister filter 215 is additionally provided to the canister 213. A drain tube 217 has an air vent hole 216 for the canister filter 215. The drain tube 217 has a drain joint 218 connected to a distal end thereof. The drain joint 218 faces the floor frame 211. In the prior art design shown in FIG. 7, the drain joint 218 is formed with a relatively sharp bend therein, which will force any air or air-fuel mixture flowing therethrough to make at least one relatively sharp turn.

In the canister attachment structure 210, the drain tube 217 extends from the air vent hole 216 of the canister filter 215 provided to the canister 213. It is necessary to consider measures against vapor leakage and the increased number of man-hours required for installation as attributable to the extension of the drain tube 217.

SUMMARY OF THE INVENTION

An object of the present invention is to provide a vehicular canister attachment structure that eliminates a need for a drain tube, reduces the number of man-hours required for installation, and lowers the cost.

According to the present invention, there is provided a vehicular canister attachment structure which comprises: a body forming member forming part of a vehicle body; and a canister mounted on one of bottom and side surfaces of the body forming member, the canister having an air communication part inserted into the body forming member.

In this arrangement, the air communication part is thus inserted directly into the body forming member, making it possible to eliminate the need for a drain tube extending, e.g., from the air communication part of the canister. As a result, it is possible to reduce the number of man-hours required for installation, thereby lowering the cost. It is also possible to reduce the possibility of leakage attributable to the use of a drain tube.

Preferably, the air communication part has an insertion part located within the body forming member, and the insertion part doubles as a part for attaching the canister to the body forming member. That is, the insertion part replaces an attachment part; therefore, the extraneous attachment part is not needed. The number of man-hours required for installation can be reduced, and the cost can be reduced.

Desirably, the insertion part is inserted with a clearance into an insertion hole formed in the body forming member and has a seal member for covering the insertion hole. The insertion part of the air communication part can be readily inserted into the insertion hole of the body forming member. The work efficiency during installation is accordingly improved. The insertion part also has a seal member for covering the insertion hole, making it possible to prevent the ingress of dust and rainwater via the insertion hole of the body structural part. A low-dust environment and a low-humidity environment are accordingly obtained.

In a preferred form, the canister has a canister body and a canister filter added to the canister body.

The air communication part may be provided in the canister filter.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
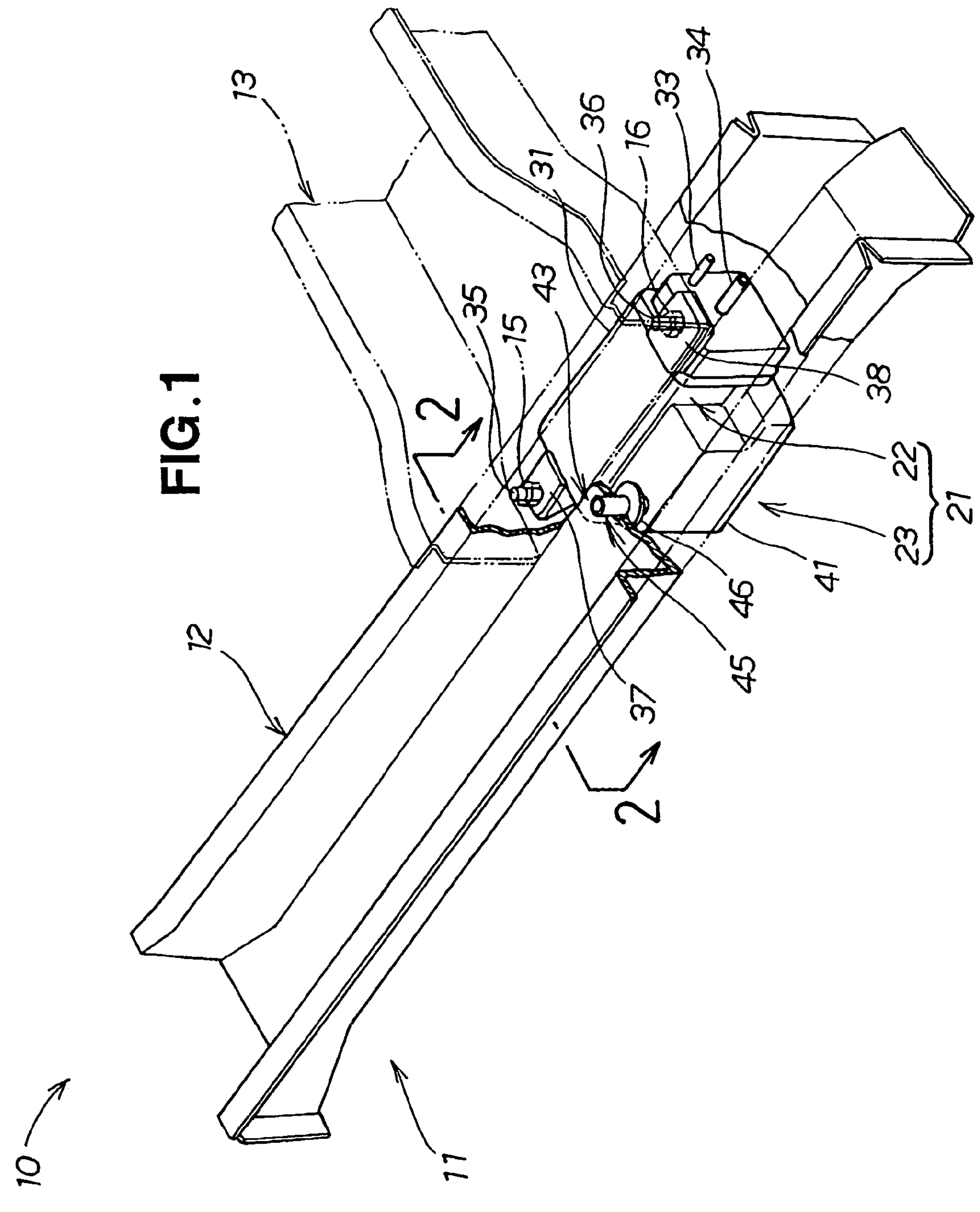
FIG. 1 is a partial cross-sectional perspective view of a vehicular canister attachment structure according to a first embodiment of the present invention.
Figure 2:
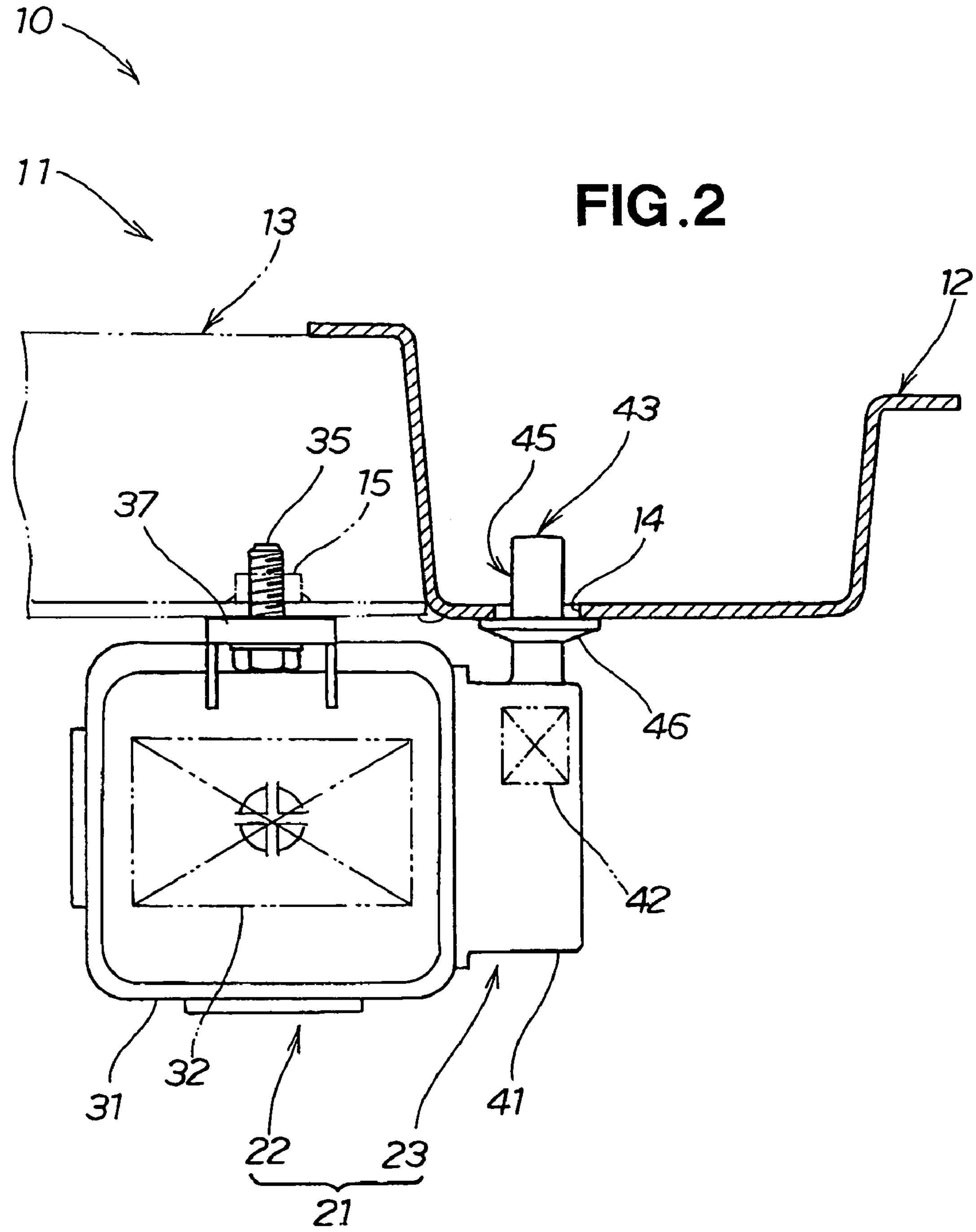
FIG. 2 is an enlarged cross-sectional view taken along line 2-2 of FIG. 1.

Part of a vehicle body 11 equipped with a canister is shown in FIGS. 1 and 2. the vehicle body 11 comprises a floor frame 12 disposed so as to extend along a longitudinal direction of the vehicle and a cross-member 13 provided so as to intersect the floor frame 12. Specifically, the floor frame 12 and the cross-member 13 are body forming members constituting a vehicle body.

The canister attachment structure 10 is equipped with a canister 21 attached to a bottom surface of the floor frame 12 and the cross-member 13. In the present embodiment, the canister 21 is shown as being attached to an under surface of the body forming member. This is merely an example and it may be attached to a side surface of the body forming member such as the floor frame 12.

The floor frame 12 is a member having a substantially U-shaped cross-section that opens upwardly. The vehicle body floor (not shown) is disposed on an upper part of the floor frame 12 and is welded securely to the floor frame 12. Therefore, the floor frame 12 is constructed having a closed cross-section that impedes the ingress of water and dust. The floor frame 12 has an insertion hole 14 formed so as to enable insertion of an insertion part 45 having an air communication part 43. An inner diameter of the insertion hole 14 is sufficiently larger than an outside diameter of the insertion part 45 of the air communication part 43. Work efficiency during installation of the canister 21 is accordingly increased.

The cross-member 13 is joined to the floor frame 12, and the vehicle body floor is welded. The cross-member 13 has canister attachment parts 15, 16 for attaching the canister 21.

Volatile fuel is introduced into the canister 21 from the fuel tank (not shown) and temporarily stored. The canister 21 comprises a canister body 22 for supplying the volatile fuel to an engine (not shown) and a canister filter (dust filter) 23 that is provided to the canister body 22 and cleans the air.

The canister body 22 is equipped with a canister housing 31; activated carbon 32 that is stored in the canister housing 31, adsorbs (traps) the volatile fuel, and discharges the volatile fuel; a volatile fuel intake port 33 that is formed in the canister housing 31, is connected to the fuel tank, and admits volatile fuel from the fuel tank; a volatile fuel discharge port 34 that is formed in the canister housing 31, is connected to the engine, and supplies volatile fuel to the engine; and mounting flanges 37, 38 that are formed on the canister housing 31 and are attached to the cross-member 13, using bolts 35, 36.

The canister filter 23 is equipped with a filter housing 41 attached externally to the canister housing 31, a filter element 42 (see FIG. 2) that is housed in the filter housing 41 and cleans the air, and the air communication part 43 formed together with, and as an integral part of the filter housing 41. In the depicted embodiment, the filter housing 41 is entirely disposed below the floor frame 12.

The air communication part 43 has air intake and discharge ports for admitting outside air into the canister 21 and discharging the air within the canister 21 into the atmosphere. The air communication part 43 has an insertion part 45 that is formed from a pipe member and is inserted into the insertion hole 14 of the floor frame 12; and a seal member 46 that is attached around the insertion part 45 and seals the insertion hole 14 of the floor frame 12.

The insertion part 45 is fitted with clearance into the insertion hole 14 in the body forming member (floor frame) 12; therefore, the insertion part 45 can be readily inserted into the insertion hole 14. Work efficiency during installation can accordingly be improved.

The insertion part 45 has the seal member 46 for covering the insertion hole 14, making it possible to prevent the ingress of dust and rainwater into the filter housing 41 via the insertion hole 14 in the body forming member 12.

In the canister attachment structure 10 of the first embodiment, the air communication part 43 is disposed within the body forming member (floor frame) 12 by directly inserting the air communication part 43 of the canister filter 23 or the canister 21 into the body forming member 12, where the air communication part 43 is formed as an integral part of the filter housing. The drain tube extending from the air communication part 43 in the conventional canister filter 23 is accordingly obviated. As a result, it is possible to reduce the number of man-hours required for installation, and lower the cost. As seen best in FIG. 2, in the arrangement according to the present invention, the filter housing portion 41 of the canister 21 is substantially entirely disposed below the floor frame member 12, and the filter element 42 is disposed below, and proximate the insertion hole 14 formed in the body forming member (floor frame) 12, and the insertion part 45 extends substantially along a straight line from the filter housing, whereby air enters or leaves the canister traveling along a substantially linear flow. It is also possible with the canister 21 according to the present invention to reduce the possibility of leakage attributable to the use of a drain tube.

Figure 3:
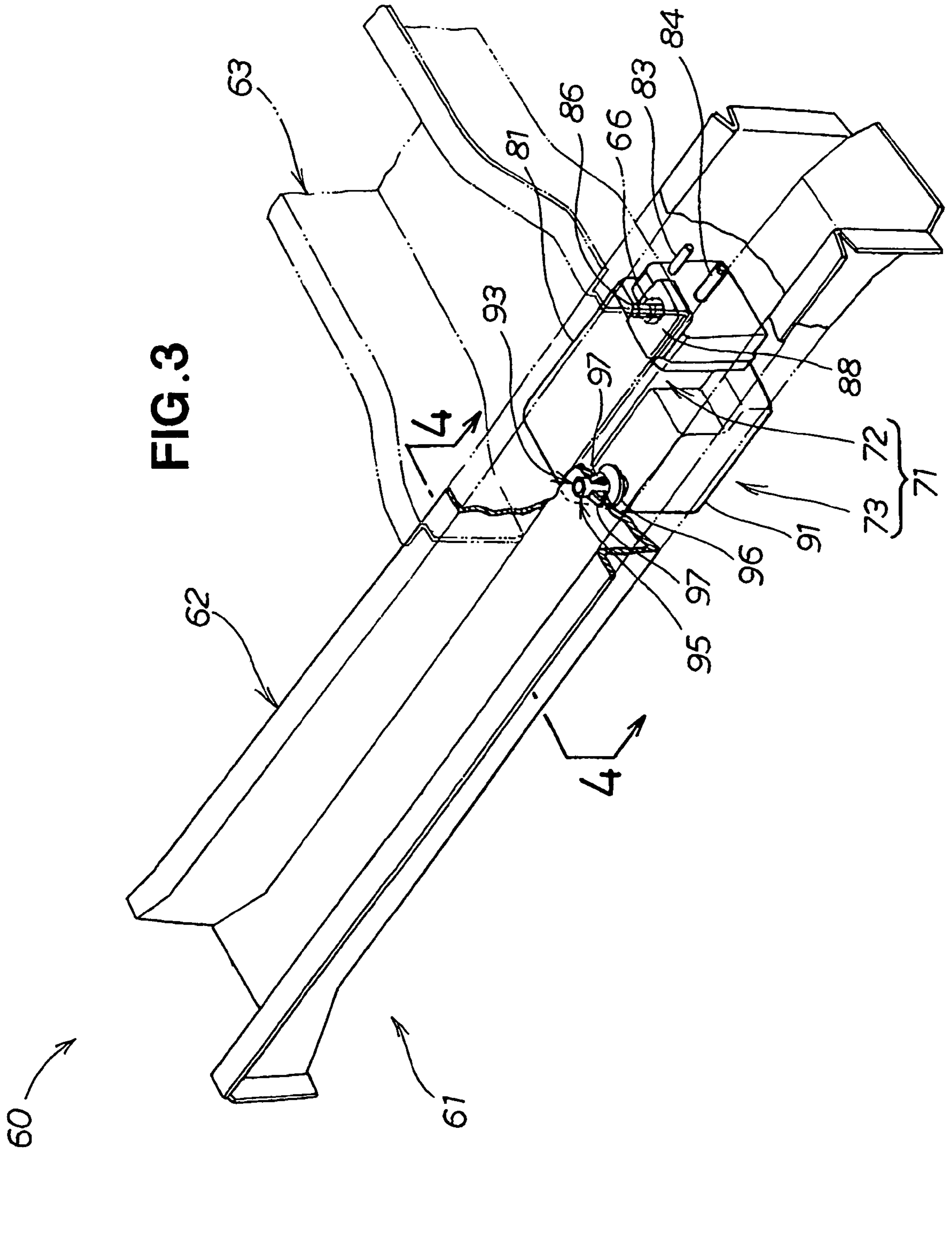
FIG. 3 is a partial cross-sectional perspective view of a vehicular canister attachment structure according to a second embodiment of the present invention.
Figure 4:
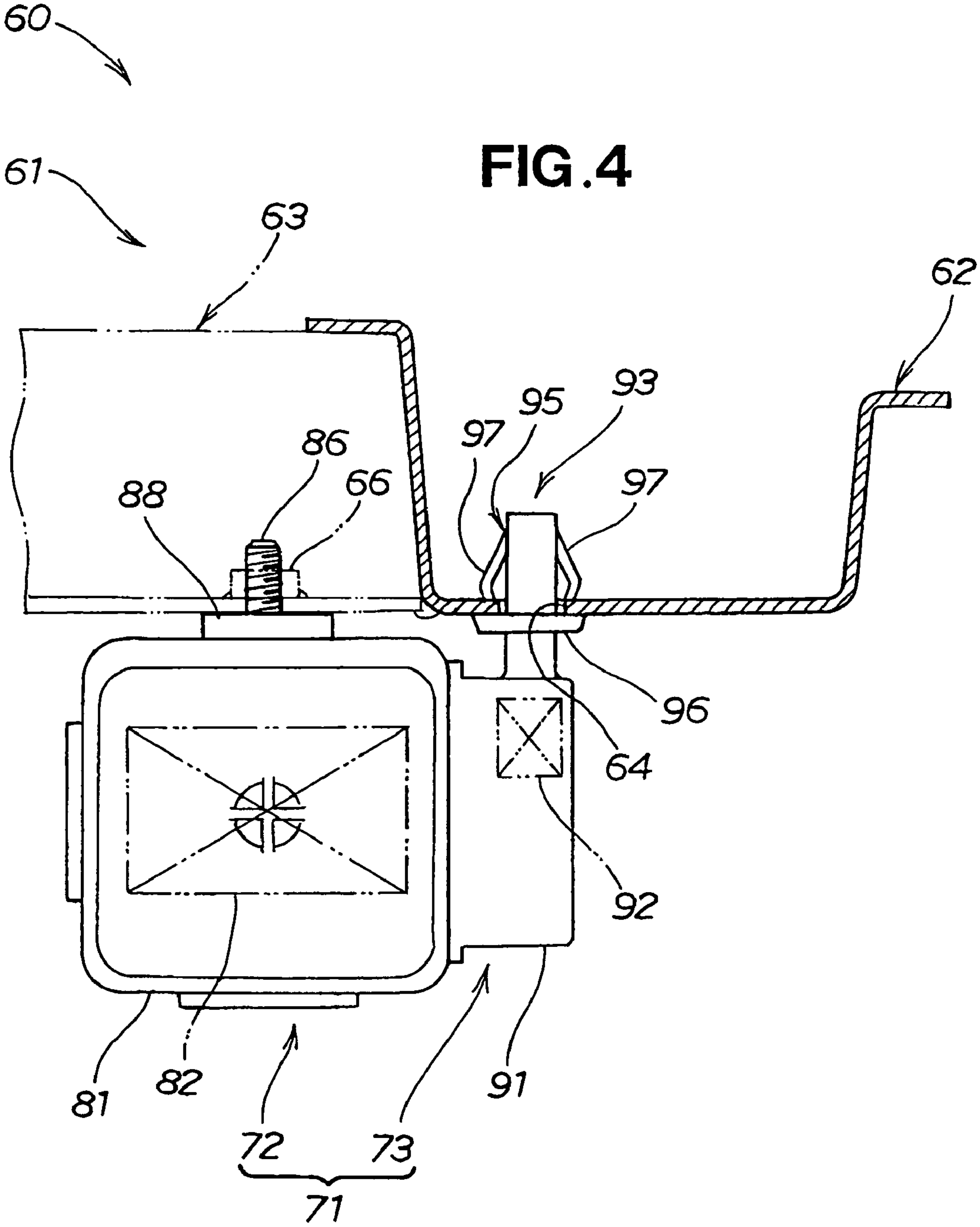
FIG. 4 is an enlarged cross-sectional view taken along line 4-4 of FIG. 3.
Figure 5:
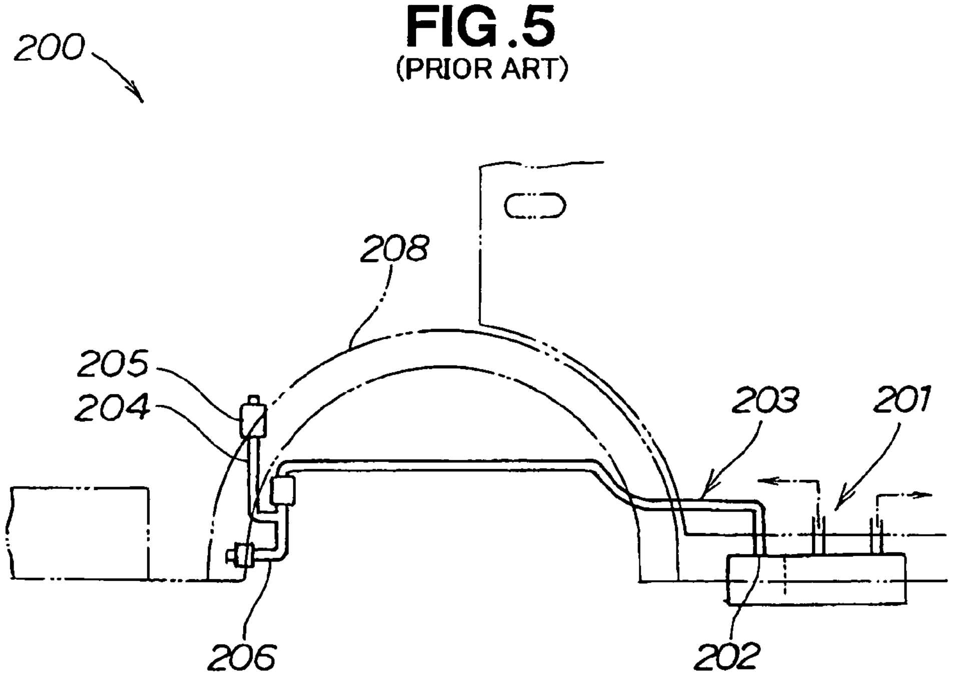
FIG.5 (PRIOR ART)
FIG. 5 is a schematic view of a conventional vehicular canister attachment structure.
Figure 6:
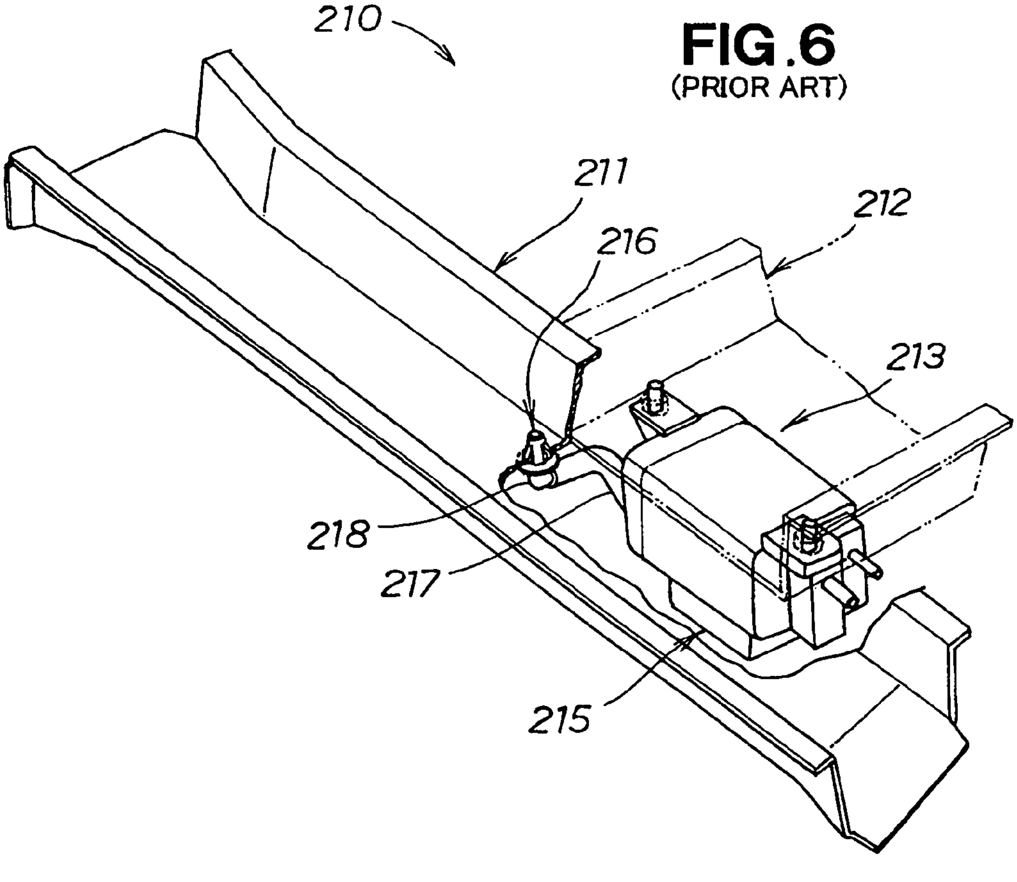
FIG.6 (PRIOR ART)
FIG. 6 is a partial cross-sectional perspective view showing a conventional vehicular canister attachment structure that is different from the one shown in FIG. 5.
Figure 7:
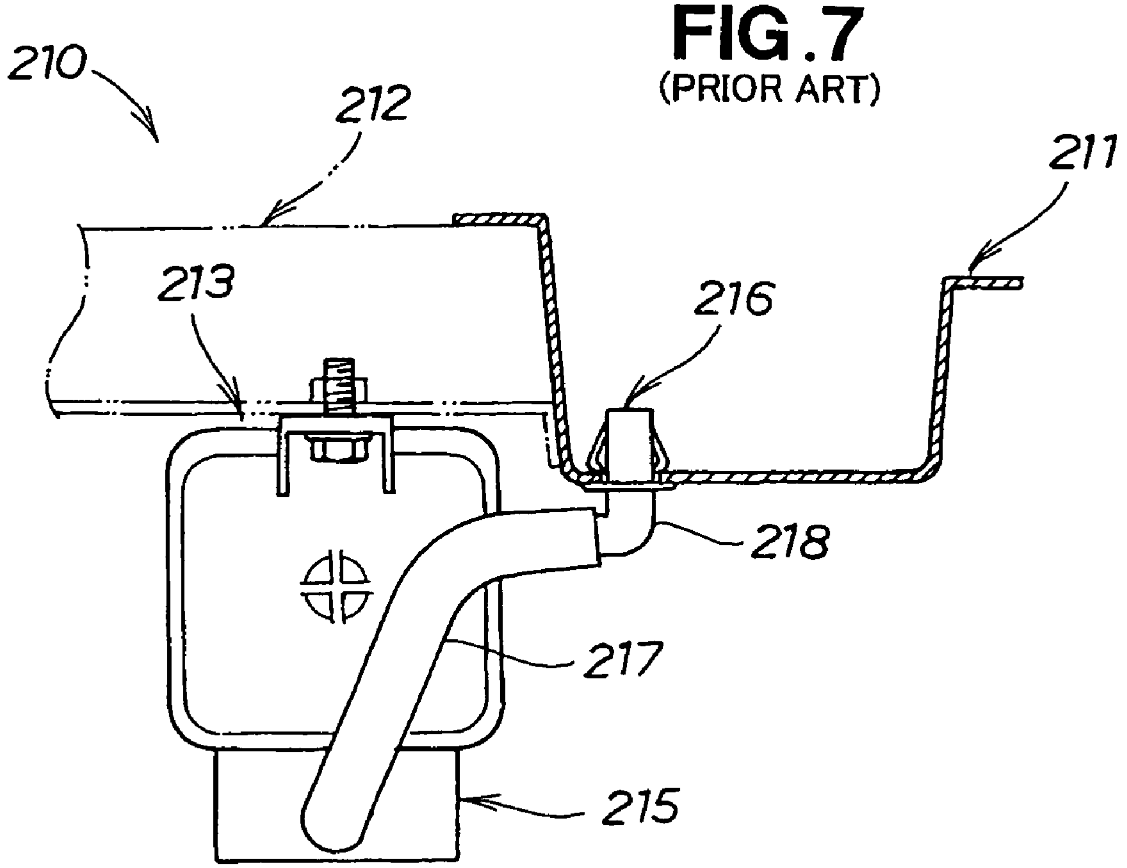
FIG. 7 (PRIOR ART)
FIG. 7 is a cross-sectional view of the canister attachment structure shown in FIG. 6.

The canister attachment structure of the second embodiment is shown in FIGS. 3 and 4.

The canister attachment structure 60 of a second embodiment comprises a canister 71 attached to a bottom surface of a floor frame 62 and a cross-member 63, which constitute a vehicle body 61. The floor frame 62 and the cross-member 63 are body forming members constituting the vehicle body 61.

The floor frame 62 has an insertion hole 64 formed so that an insertion part 95 of an air communication part 93 passes therethrough. The insertion part 95 is locked by a surrounding part forming the insertion hole 64. Specifically, the insertion hole 64 functions as a locking hole for preventing the insertion part 95 from falling out of the floor frame.

The cross-member 63 has a canister attachment part 66 for attaching the canister 71 to the cross-member 63.

The canister 71 comprises the canister body 72 and a canister filter (dust filter) 73.

The canister body 72 has a canister housing 81, activated charcoal 82 (FIG. 4), a volatile fuel intake port 83, a volatile fuel discharge port 84, and a mounting flange 88 attached to the cross-member 63 by a bolt 86.

The canister filter 73 has a filter housing 91, a filter element 92 (FIG. 4), and the air communication part 93.

The air communication part 93 has the insertion part 95 for insertion into the floor frame 62, a seal member 96, and a plurality of locking pawls 97, 97 that are provided to the insertion part 95 and are used for locking the canister filter 73 to the floor frame 62.

In the canister attachment structure 60 of the second embodiment, the canister body 72 that constitutes the canister 71 is fastened to the cross-member 63 by the bolt 86, with the mounting flange 88 interposed therebetween. The canister filter 73 constituting the canister 71 is locked to the floor frame 62, by the locking pawls 97, 97, with the insertion part 95 interposed therebetween.

In other words, the insertion part 95 of the air communication part 93 doubles as the attachment part of the canister 71 or the canister filter 73. Specifically, the bolts 35, 36 are used to attach the canister 21 of the first embodiment shown in FIG. 1 to the cross-member 13 at the two attachment parts 15, 16, with the two flanges 37, 38 interposed therebetween. In the second embodiment, however, the canister filter 73 is attached using locking pawls 97, 97, with the insertion part 95 interposed therebetween. Specifically, mounting is simplified merely by substituting the locking pawl 97 for one of the two attachment parts 15, 16 of the first embodiment and inserting the insertion part 95 into the insertion hole 64 in the lower frame 62.

FIG. 2 shows an example wherein the canister 21 is attached to the cross-member 13 and the air communication part 43 of the canister filter 23 is opened into the floor frame 12 in the canister attachment structure 10 of the first embodiment. However, this example is not provided by way of limitation; and the air communication part 43 may open into another body forming member (e.g., the cross-member 13).

FIG. 2 shows an example wherein the air communication part 43 of the canister filter 23 is directly inserted into the floor frame 12 in the canister attachment structure 10 of the first embodiment. However, this example is not provided by way of limitation, and the air communication part of a canister having no filter may be inserted directly into the floor frame. This makes it possible to eliminate the drain tube extending from the air communication part of the canister, for example.

Obviously, various minor changes and modifications of the present invention are possible in light of the above teaching. It is therefore to be understood that within the scope of the appended claims the invention may be practiced otherwise than as specifically described.

What is claimed is:

1. A vehicular canister attachment structure comprising:

a body forming member forming a part of a vehicle body; and a canister mounted on a bottom surface of the body forming member, wherein the canister comprises a canister body and a canister filter affixed to a side portion of the canister body, the canister filter is disposed directly below the bottom surface of the body forming member, and the canister filter comprises a filter housing, a filter element disposed in the filter housing, and an air communication part attached to and integrally formed as part of the filter housing, the air communication part being directly inserted into the body forming member; wherein the canister is configured such that during operation, air entering or leaving the canister from the air communication part travels along a substantially linear flow passing substantially vertically downwardly or vertically upwardly through the filter element disposed in the filter housing.

2. The attachment structure of claim 1, wherein the air communication part has an insertion part located within the body forming member, and the insertion part doubles as a part for attaching the canister to the body forming member.

3. The attachment structure of claim 2, wherein the insertion part is inserted with a clearance into an insertion hole formed in the body forming member and has a seal member for covering the insertion hole.

4. The attachment structure of claim 2, wherein the air communication part has a plurality of locking pawls provided on the insertion part for locking the canister filter to the body forming member insertion part.

5. The attachment structure of claim 2, wherein the canister filter has a filter element disposed below the insertion part.

6. A vehicular canister attachment structure, comprising:

a body forming member forming a part of a vehicle body, and having an insertion hole formed therein; and a canister mounted on one of a bottom surface and a side surface of the body forming member, said canister comprising a canister body; and a canister filter affixed to a side portion of said canister body;

said canister filter comprising a filter housing, an air communication part attached to and integrally formed as part of the filter housing; and a filter element disposed in the filter housing;

wherein the canister body is attached to the body forming member in a manner such that the air communication part of the filter housing is inserted into the body forming member through the insertion hole; and wherein the canister is configured such that during operation, air entering or leaving the canister from the air communication part travels along a substantially linear flow passing substantially vertically downwardly or vertically upwardly through the filter element disposed in the filter housing.

7. The attachment structure of claim 6, wherein the air communication part has an insertion part located within the body forming member, and the insertion part doubles as a part for attaching the canister to the body forming member.

8. The attachment structure of claim 7, wherein the insertion part is inserted with a clearance into the insertion hole formed in the body forming member and has a seal member for covering the insertion hole.

9. The attachment structure of claim 7, wherein the body forming member comprises a floor frame member, and wherein the filter housing portion of the canister is substantially entirely disposed below the floor frame member.

10. The attachment structure of claim 9, wherein the filter element is disposed below and proximate the insertion hole formed in the body forming member, and wherein the insertion part extends from the filter housing substantially along a straight line.

* * * * *